United States Patent
Schweikert

(10) Patent No.: US 6,855,885 B1
(45) Date of Patent: Feb. 15, 2005

(54) ELECTRICAL COMPONENT HOUSING

(75) Inventor: Wilhelm Schweikert, Heidenheim (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 10/483,878

(22) PCT Filed: Aug. 7, 2002

(86) PCT No.: PCT/DE02/02906

§ 371 (c)(1),
(2), (4) Date: Jan. 14, 2004

(87) PCT Pub. No.: WO03/019591

PCT Pub. Date: Mar. 6, 2003

(30) Foreign Application Priority Data

Aug. 23, 2001 (DE) .......................... 101 41 354

(51) Int. Cl.⁷ .......................... H01G 2/10; H01G 4/00; H01L 21/00
(52) U.S. Cl. ...................... 174/50; 29/25.02; 361/301.3; 361/517; 361/535
(58) Field of Search ................................ 174/17 R, 50, 174/50.5; 361/272, 273, 301.3, 517, 535; 29/25.01, 25.02, 25.03

(56) References Cited

U.S. PATENT DOCUMENTS

| 4,064,611 A | * | 12/1977 | Sobozenski et al. .......... 29/270 |
| 4,090,288 A | * | 5/1978 | Thompson et al. ........ 29/25.03 |
| 4,992,910 A | * | 2/1991 | Evans ......................... 361/521 |
| 5,117,333 A | * | 5/1992 | Kakuma et al. ............ 361/527 |
| 5,621,189 A | * | 4/1997 | Dodds .......................... 174/50 |
| 6,212,065 B1 | * | 4/2001 | Pozdeev-Freeman et al. .... 361/528 |
| 6,366,446 B1 | | 4/2002 | Schweikert et al. |
| 6,411,499 B2 | * | 6/2002 | Kormendy et al. ......... 361/539 |
| 6,451,074 B2 | * | 9/2002 | Bluvstein et al. .......... 29/25.03 |
| 6,452,784 B2 | * | 9/2002 | Nakada et al. .............. 361/509 |
| 6,521,830 B1 | * | 2/2003 | Platz ........................... 174/50 |
| 6,529,366 B2 | * | 3/2003 | Nakamura ................... 361/523 |
| 6,552,893 B2 | * | 4/2003 | Tanaka et al. ........... 361/301.3 |
| 6,757,151 B2 | * | 6/2004 | Eriksson et al. ............. 361/273 |

FOREIGN PATENT DOCUMENTS

| DE | 296 17 888 | 6/1997 |
| DE | 196 42 462 | 4/1998 |
| DE | 298 04 892 | 8/1998 |
| DE | 198 11 862 | 6/1999 |
| FR | 2 294 526 | 7/1976 |
| GB | 2 052 157 | 6/1980 |
| JP | 63299314 | 12/1988 |
| JP | 04338624 | 11/1992 |
| JP | 09283384 | 10/1997 |

* cited by examiner

Primary Examiner—Anthony Dinkins
Assistant Examiner—Adolfo Nino
(74) Attorney, Agent, or Firm—Fish & Richardson P.C.

(57) ABSTRACT

A housing for an electrical component includes an electrically conductive cup which includes a wall, a floor, and a cover having electrical terminals. The housing also includes an electrically insulating coating applied to an outside of the floor and adjoining regions of the wall, and an electrically insulating covering which covers the wall at least partially and which overlaps the electrically insulating coating. The electrically insulating covering is on the electrically insulating coating and does not coat the floor. A mounting plate is also included on which the floor is positioned.

16 Claims, 1 Drawing Sheet

ELECTRICAL COMPONENT HOUSING

BACKGROUND

These types of housings are typically manufactured from aluminum for aluminum electrolyte capacitors, for example. Such capacitors are attached to mounting plates individually or also in banks. Since the aluminum housing of the capacitor typically has the potential of the anode or the cathode applied to it, the housing must be electrically insulated to the outside. In particular, cup-like housings whose cup floors are attached flat on a mounting plate must be electrically insulated in relation to this plate.

When aluminum electrolyte capacitors are loaded with high currents, heat is generated which must be dissipated outward. The mounting plates for the capacitors are generally made of metal and are then used as heat sinks for dissipating the waste heat. The maximum current carrying capacity of the capacitor improves with improved heat dissipation from the capacitor. Then, for example, the number of capacitors may be reduced with the same current carrying capacity in capacitor banks.

The housing of the capacitors must therefore be electrically insulated in relation to the mounting plates made of metal, but good heat conduction between the capacitor housing and the mounting plates must also be possible. For this reason, air gaps between the floor of the housing and the mounting plate are to be avoided, since they are only very poor heat conductors.

Housings for electrolyte capacitors are frequently electrically insulated in that the wall of the housing is covered with an electrically insulating covering, for example, a heat-shrinkable sleeve made of plastic. A plastic cap is positioned on the floor of the housing, which is shrunk into the heat-shrinkable sleeve. When such a housing is mounted on a mounting plate, a planar air gap results at the floor of the cup, so that the heat dissipation from the housing via the plate is impaired.

A housing for electrochemical capacitors in which the floor of the housing and adjoining regions of the wall of the housing are enclosed by a plastic cup which is covered by a heat-shrinkable sleeve is known from the patent specification DE 198 11 862 C1. This housing has the disadvantage that the wall thicknesses of the plastic cup are relatively thick for reasons of injection molding technology, so that only poor heat conduction may be ensured between the mounting plate and the housing through the plastic cup. Furthermore, the mounting of this housing is relatively complicated, since, among other things, the heat-shrinkable sleeve must be pulled over the plastic cup, which is connected with difficulties due to the wall thicknesses of the plastic cup. In addition, the plastic cup must be tailored to the shape of each individual construction of each capacitor, which makes the production of different capacitor types having this housing construction more difficult. Because of the separate shaping for the plastic cup and the housing, very narrow manufacturing tolerances are also to be maintained in order to ensure a tight fit of the plastic cup on the housing without air gaps.

SUMMARY

The object of the present invention is to refine the latter housing in such a way that the difficulties cited above are avoided.

This object is achieved according to the present invention with a housing according to claim 1. Advantageous embodiments of the housing, as well as methods for manufacturing the housing, are the object of further claims.

A housing for electrical components, particularly capacitors, is described which has an electrically conductive cup having a wall and a floor and a cover having electrical terminals. The floor of the cup is positioned on a mounting plate. An electrically insulating coating applied to the outside of the floor and adjoining regions of the wall of the cup, which is overlapped by an electrically insulating covering that covers the wall of the cup, but not its floor. This electrically insulating coating is produced according to the present invention through coating directly on the housing and is not, as in the housing cited as the related art, pushed on as a plastic cup.

This has the advantage that a coating according to the present invention may be implemented significantly thinner than a plastic cup, so that better heat conduction from the floor of the housing to the mounting plate via the coating according to the present invention may be ensured. Furthermore, the mounting of the housing according to the present invention is simpler, since the electrically insulating coating on the regions of the wall adjoining the floor of the housing has a soft runout as a result of the coating method, and not a sharp step as in the case of the plastic cup. For this reason, it is especially simple to push on the electrically insulating covering from above over the runout, since no interfering steps hinder this. There is also no special requirement to be placed on the runout of the electrically insulating coating, since this runout is covered by the electrically insulating covering. Since the coating may be produced directly on the housing, solid, tight-fitting adhesion on the housing without air gaps may also be ensured.

The housing according to the present invention thus combines advantages of an electrically insulating covering, which is especially simple to apply and also insulates the cover region of the housing and a large part of the housing wall especially reliably, with the advantages of the electrically insulating coating on the floor, which allows especially good heat dissipation.

Floor beads are frequently provided in the housing of the capacitors to attach the housing onto mounting plates using ring clips or clamping lugs. In the case of the housing according to the present invention, optimum enveloping of the floor beads with the electrically insulating coating is achieved without possibly interfering air gaps arising and without damage of the electrically insulating coating occurring during attachment of the housing due to the high stretching. Since the electrically insulating coating is not implemented in the form of a plastic cup, but rather is applied to the cup of the housing, greatly varying constructions may easily be provided with the coating, without individual adaptations to the particular capacitor type having to be performed.

The electrically insulating coating may be applied through typical coating methods such as powder coatings. Thus, for example, whirl sintering suggests itself, the housing being heated and the regions of the housing to be coated (floor and adjoining regions of the wall) being introduced into a powder bath of an electrically insulating material which has gases flow through it from below in such a way that a whirl coating forms. The electrically insulating material is then melted due to the high temperature of the heated housing, so that the electrically insulating coating according to the present invention results. This coating is advantageously also smoothed in the hot state by placing the housing on a smooth and even surface, for example, so that upon the later mounting of the housing on the mounting plate, especially tightly-fitting contact which is free of air gaps may be ensured between the mounting plate and the coating.

Subsequently, the electrically insulating covering is pulled over the wall of the housing and attached, the covering overlapping the electrically insulating coating. The electrically insulating covering advantageously includes a heat-shrinkable sleeve, based on polyvinyl chloride, polyethylene, or polyethylene terephthalate, for example. The heat-shrinkable sleeve may advantageously be shrunk through heating and thus attached to the housing.

The housing may then be mounted on the mounting plate, additional smoothing of the electrically insulating coating advantageously being able to be achieved through elevated pressure. It is also possible to heat the electrically insulating coating once again before mounting in order to achieve better deformability of the material. To mount the housing, for example, the floor bead cited above is positioned in the housing or a threaded pin is provided on the floor of the housing so that the housing may be screwed together with the mounting plate.

It is also possible to provide the electrically insulating coating according to the present invention through electrostatic coating. In this case, the housing may be electrostatically charged and subsequently brought into contact with the fine-grained electrically insulating material in such a way that a fine-grained layer forms on the regions of the housing to be coated. This layer may subsequently be melted onto the housing through heating so that the electrically insulating coating according to the present invention results. Similarly as in whirl sintering, additional smoothing of the coating may also be achieved in the hot state in this case by pressing onto an even and smooth surface. The further manufacturing and mounting of the housing is then performed as already described above.

The electrically insulating coating is advantageously made of plastic, for example, thermoplastics or duroplastics such as polypropylene, polyamide, or epoxide resin.

In order to achieve optimum heat conduction between the floor of the housing and the heat sink, additional heat conducting films or heat conducting adhesives may also be used, for example, which are positioned between the electrically insulating coating and mounting plate. In principle, it is possible to coat the floor of the housing cup even before mounting or to first coat the finished capacitor.

In the following, the housing according to the present invention is to be described in greater detail on the basis of two figures and exemplary embodiments.

DETAILED DESCRIPTION

Figure 1:
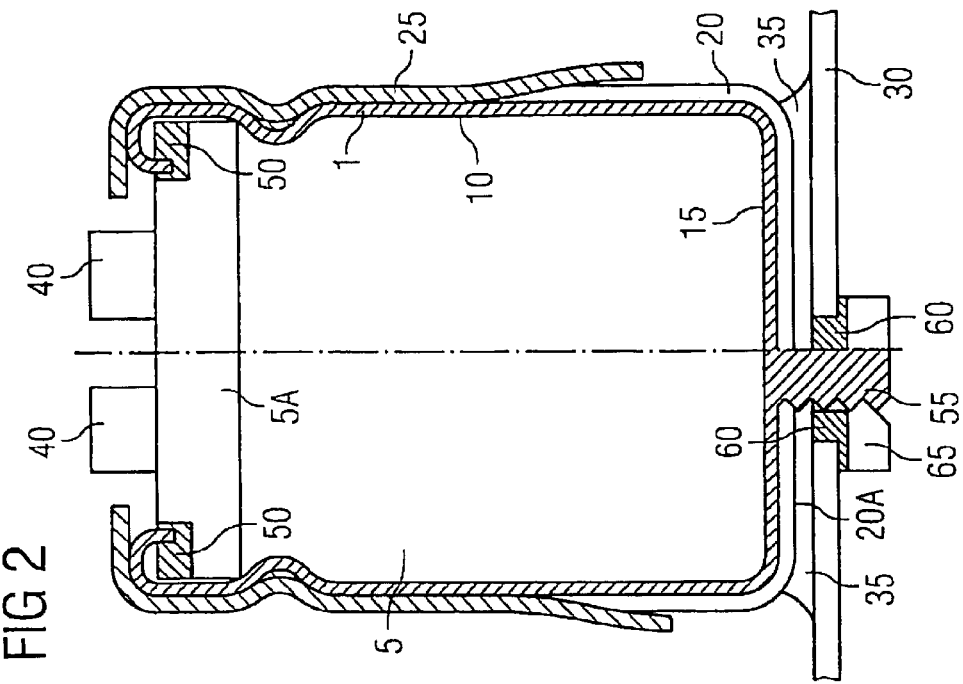
FIG. 1 shows a cross-section through a housing according to the present invention.

A housing 1 for capacitors, whose cup 5 includes the wall 10 of the cup and the floor 15 of the cup, may be seen in FIG. 1. A cover 5A, on which electrical terminals 40 are positioned, terminates the cup 5 on top. A rubber ring 50 is positioned between the cover and the housing to form a seal.

An electrically insulating coating 20 is applied to the floor 15 of the cup and regions 10A of the wall 10 of the cup adjoining the floor. This coating also covers a floor bead 45, which is used to attach the housing on the mounting plate using ring clips or clamping lugs. The floor bead advantageously runs around the entire housing, so that no predetermined positioning of the housing is necessary during the mounting on the mounting plate. Alternatively, the housing may also be attached to the mounting plate via a threaded pin 55. For reasons of simplification, both alternative attachment devices are shown in FIG. 1.

The wall 10 of the cup 5 is enclosed by an electrically insulating covering 25 which overlaps the electrically insulating coating 20, but does not cover the floor of the cup. In this case, the electrically insulating covering includes a shrunken heat-shrinkable sleeve based on a thermoplastic.

Figure 2:
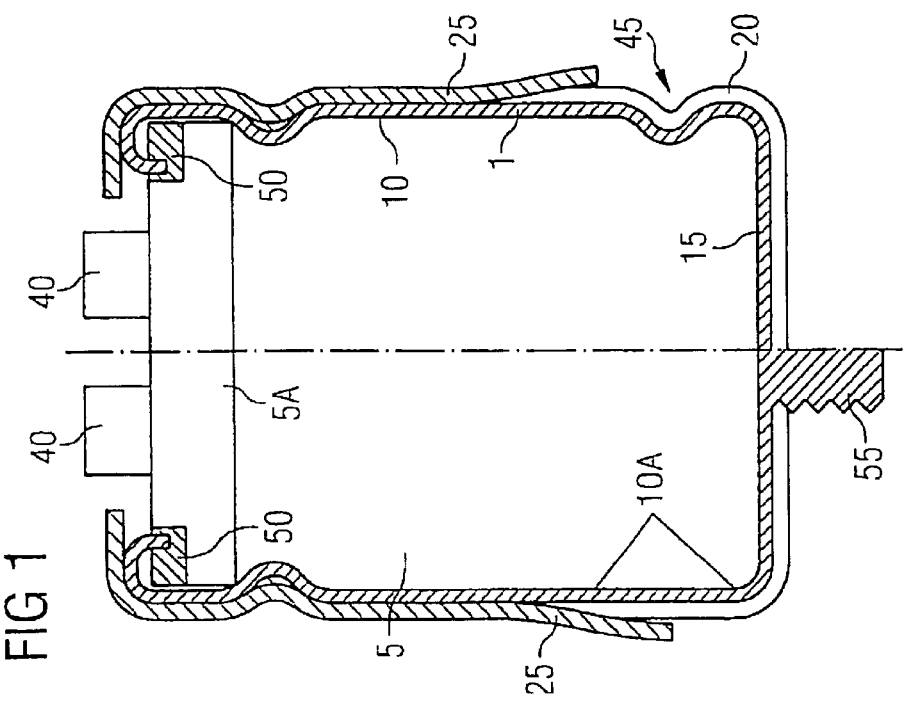
FIG. 2 shows a housing according to the present invention which is mounted on a mounting plate.

The housing according to the present invention, which is mounted in this case on the mounting plate 30 using a threaded pin 55 and a nut 65, may be seen in FIG. 2. An insulating disk 60, which also electrically insulates the nut from the mounting plate, is located between the threaded pin and the mounting plate. In order to ensure especially good heat conduction, a heat conducting material 35 may also be positioned between the electrically insulating coating 20 on the floor 15 of the cup and the mounting plate 30. For example, a heat conducting adhesive or heat conducting film may be used as the heat conducting material.

The present invention is not restricted to the exemplary embodiments shown. Variations are possible, above all in regard to the material used for the electrically insulating covering and the electrically insulating coating, and in regard to the material of the housing and its shape. For example, a coating method in which liquid electrically insulating material is applied to the housing is also conceivable.

What is claimed is:

1. A housing for an electrical component, the housing comprising:

an electrically conductive cup which includes a wall, a floor, and a cover having electrical terminals;

an electrically insulating coating applied to an outside of the floor and adjoining regions of the wall;

an electrically insulating covering which covers the wall at least partially and which overlaps the electrically insulating coating, the electrically insulating covering being on the electrically insulating coating and not coating the floor; and a mounting plate on which the floor is positioned.

2. The housing of claim 1, further comprising a layer of a heat conducting material positioned between the mounting plate and the electrically insulating coating on the floor of the cup.

3. The housing of claim 1, wherein the electrically insulating coating is made of plastic.

4. The housing of claim 1, wherein the electrically insulating coating is made of a thermoplastic or duroplastic.

5. The housing of claim 1, wherein the electrically insulating coating is made of polypropylene, polyamide, or epoxide resin.

6. The housing of claim 1, wherein the electrically insulating covering includes a shrunken heat-shrinkable sleeve.

7. The housing of claim 1, wherein the electrically insulating covering includes a heat-shrinkable sleeve made of polyvinyl chloride, polyethylene, or polyethylene terephthalate.

8. A method of manufacturing a housing for an electrical component which includes an electrically conductive cup comprised of a wall, a floor, and a cover having electrical terminals, the method comprising:

coating the floor and adjoining regions of the wall with an electrically insulating coating; and applying an electrically insulating covering to the wall of the cup so that the electrically insulating covering partially overlaps the electrically insulating coating and attaches to the wall.

9. The method according to claim 8, wherein the electrically insulating coating is applied via whirl sintering followed by melting.

10. The method according to claim 9, further comprising, after melting, smoothing the electrically insulating coating while the electrically insulating coating is hot.

11. The method according to claim 10, wherein the electrically insulating coating is smoothed by placing the cup on a smooth and even surface.

12. The method according to claim 8, wherein the electrically insulating coating is applied via electrostatic coating followed by melting.

13. The method according to claim 12, further comprising, after melting, smoothing the electrically insulating coating while the electrically insulating coating is hot.

14. The method according to claim 13, wherein the electrically insulating coating is smoothed by placing the cup on a smooth and even surface.

15. The method according to claim 8, wherein the electrically insulating covering comprises a heat-shrinkable sleeve that is shrunk onto the cup via heating.

16. The method according to claim 8, further comprising:
   heating the electrically insulating coating; and
   mounting the housing on a mounting plate so that the electrically insulating coating is smoothed via pressure applied during mounting.

* * * * *